United States Patent

[11] 3,567,856

[72] Inventor Koji Nezu
Tokyo, Japan
[21] Appl. No. 800,151
[22] Filed Feb. 18, 1969
[45] Patented Mar. 2, 1971
[73] Assignee Nippon Electric Company, Limited
Tokyo, Japan
[32] Priority Feb. 20, 1968
[33] Japan
[31] 43/10879

[54] PATTERN GENERATOR APPARATUS
10 Claims, 5 Drawing Figs.

[52] U.S. Cl. .......... 178/7.2, 178/6.8, 340/324
[51] Int. Cl. .......... H04n 5/30
[50] Field of Search .......... 178/7.1, 7.2, 6, 6.8, 7.2 (D); 340/324.1; 315/11

[56] References Cited

UNITED STATES PATENTS

| | | | |
|---|---|---|---|
| 3,324,346 | 6/1967 | Stone .......... | 315/11 |
| 3,349,172 | 10/1967 | Mauchel .......... | 178/6.8 |
| 3,414,668 | 12/1968 | Adams et al. .......... | 178/7.7 |

*Primary Examiner*—Robert L. Richardson
*Attorney*—Marn & Jangarathis

ABSTRACT: Pattern generator apparatus is provided according to the present invention wherein image pickup means relying upon electron beam scanning is utilized to accomplish the translation of digital information into characteristic and symbolic information. In addition, prescanning of the target face of the image pickup means is relied upon prior to the read scanning thereof so that any residual image present thereon due to a preceding generation sequence in the area of the said target face to be read scanned may be erased. However, as such prescanning is restricted solely to the area of the target face which is to be read scanned, a high speed mode of generation is maintained. According to one embodiment of the present invention, the pattern generator apparatus includes a plurality of pattern carrying films and a plurality of associated flash tubes positioned in light communication with the target face of image pickup means having an electron beam scan, the plurality of associated flash tubes are adapted to be energized on a time division basis by digital signals applied thereto and said electron beam is adapted for prescanning and thereafter read scanning a predetermined portion of the target face of said image pickup tube in response to digital signals applied to the control means therefor.

INVENTOR.
Koji Nezu
BY
Marn & Jangarathis
ATTORNEYS

INVENTOR.
Koji Nezu

BY

Marn & Jangarathis
ATTORNEYS

INVENTOR.
Koji Nezu
BY
Marn & Jangarathis
ATTORNEYS

INVENTOR.
Koji Nezu
BY
Marn & Jangarathis
ATTORNEYS

PATTERN GENERATOR APPARATUS

This invention relates to pattern generator apparatus and more particularly to pattern generator apparatus which is responsive to digital information to produce electrical signals representative of characters and symbols to be printed or displayed.

Although electronic computers when initially introduced served merely as computational aids, today they find widely diversified application in almost every conceivable field of endeavor. In accordance with this general trend, digital computers are now finding substantial areas of application within fields directed to document production, the compilation of printed articles, and the areas related thereto. As is the general case, in the areas of application of digital computers within the fields directed to document production and the like, the high speeds at which information may be retrieved from digital computers are usually substantially limited by the rate at which such information may be accepted and acted upon by the peripheral equipment connected thereto. Thus, in the areas of application of digital computers within the fields directed to document production and similar areas related thereto, the need for high speed printer and display systems for various types of characters and symbols has become manifest.

In current high speed printer and display systems which act to receive the digital output of the computer and thereafter provide a display or a printout of the characters and symbols that such digital output represents, the pattern generator apparatus utilized therein is of prime importance because it is here that the translation from digital information to characteristic and symbolic information occurs. Furthermore, as the pattern generator apparatus generally comprises one of the initial links that such high speed printer and display systems have with the output of the computer, it is of paramount importance that such pattern generator apparatus exhibit high speed and high resolution.

Exemplary of conventional pattern generator apparatus which is currently relied upon to accomplish the foregoing functions is the Kanji (Chinese Character) pattern generator described in the paper entitled "A Design Of A High Speed Kanji Printer, " published in the Proceedings of The 33rd FID Conference and International Congress on Documentation, held Sept. 20—22, 1967. As described therein, the Kanji pattern generator relied upon takes the form wherein a film or glass plate on which a number of Kanji characters have been printed in positive or negative form is selectively scanned by a flying spot scanner. The flying spot scanner utilized must exhibit a resolution which exceeds 3,000 lines in order to discriminate the more than 2,500 characters and symbols present, and in addition thereto, the accuracy obtained in the scanning of the pattern carrying film or plate should be appropriate to select a desired one out of the more than 2,500 Kanji patterns. Furthermore, in order to achieve precise control over the scanning, the electronic circuits associated with the high performance flying spot scanner must be of unusually high quality. Thus, although the speed and accuracy of the above-described pattern generator apparatus has been generally satisfactory, the resultant apparatus has been relatively expensive to maintain and manufacture due to the requirements of the flying spot scanner included therein and, in addition thereto, it is doubtful that such apparatus could ever be reduced sufficiently in size to be dimensionally consistent with the remainder of the components necessary in conventional high speed printer and display systems.

As the undesirable aspects of pattern generator apparatus in accordance with the foregoing publication are intimately tied to the use of the high performance flying spot scanner, it is necessary in order to avoid such undesirable aspects to replace the high performance flying spot scanner and the circuitry associated therewith with other means whose characteristics are more compatible with the desire for compact apparatus which is more economical. One such means which would be suitable for use in pattern generator apparatus similar to that described above would be a member of the class of photoelectric conversion devices wherein electron beam scanning replaces the light beam scanning of the flying spot scanner. Vidicon means comprise a well-known member of the foregoing class of photoelectric conversion devices wherein a light irradiated photoconductive element is scanned by an electron beam to produce a video component which after suitable application may be relied upon to reproduce the original image scanned. However, presently available vidicon means are not capable of producing the high resolution attainable with a flying spot scanner and furthermore, such vidicon means cannot discriminate the more than 2,500 characters and symbols as required by the foregoing Kanji display system when such patterns are projected on the face of the vidicon means through a single pattern carrying film or plate. Thus, although such vidicon means would provide the requisite dimensions and economics desired in the pattern generator apparatus maintained above, the resolution and discrimination capabilities of presently available vidicon means prevent their use in pattern generator apparatus which are required to operate in conjunction with a large number of characters and symbols.

It has been found in accordance with the present invention that the resolution and discrimination characteristics necessary for the use of vidicon means in pattern generator apparatus may be appropriately obtained if the size of the pattern projected on the face of the vidicon means is sufficiently increased in size. Furthermore, it has been determined that the requirements for a large number of characters and symbols may be met while the requisite, appropriately sized pattern projected on the face of the vidicon means is maintained by the utilization of a plurality of pattern carrying films or plates, sharing the total number of characters and symbols between them, which are projected on the face of the vidicon means on a time division basis by selectively energizing flash tubes disposed in relation to each of said films or plates according to a time division sequence. Thus, according to the findings, as each of the pattern carrying films or plates has less characters and symbols thereon than that of a single pattern carrying film system, each pattern projected on the face of the vidicon means may be appropriately enlarged whereby the use of large, costly, light beam scanning, flying spot scanners, may be avoided in pattern generator apparatus designed in correspondence therewith.

In addition, as electron beam scanning image pickup means such as vidicon means inherently exhibit a residual image retaining property which may not be favorable to the time division utilization of such devices in conjunction with a plurality of pattern carrying films or plates, if such vidicon means is to be used as aforesaid in pattern generator means, it is necessary to erase the residual image formed on the face of the vidicon means by a prior projection before the succeeding projection of a different film or plate. Accordingly, to accomplish the erasure of the residual image, a prescanning of the vidicon face should precede each reading scan. However, if prescanning is to be applied to the entire face of the vidicon means, a substantial time interval would be wasted prior to each reading scan. Thus, to reduce the time interval required for prescanning and hence increase the speed of operation of such vidicon means, such prescanning may be restricted to the region of the face of the vidicon where the reading scan is to occur while the remainder of the face of the vidicon tube is left with any residual image which may be present thereon. Such selective prescanning will enable a substantial reduction in erasure time so that if a given pattern carrying plate carries 400 characters and symbols, the total time required for prescanning will occupy one four-hundreth of the time interval required for the prescanning of the entire face. Thus, reliance upon this prescanning technique will allow a single vidicon means provided with a plurality of pattern carrying films or plates as aforesaid to be utilized in pattern carrying films or plates as aforesaid to be utilized in pattern generator apparatus whose reading rate is similar to the above-mentioned prior art system without the need for the large and costly flying spot scanner means presently used in such prior art systems.

Therefore, it is an object of this invention to provide pattern generator apparatus wherein the digital information translation into characteristic and symbolic information is carried out by photoelectric conversion means relying upon electron beam scanning.

It is an additional object of this invention to provide compact and economical pattern generator apparatus capable of generating a large number of characters and symbols at high speeds.

It is a further object of this invention to provide pattern generator apparatus employing vidicon means for the translation of digital information into characteristic and symbolic information.

It is another object of this invention to provide pattern generator apparatus wherein a residual image in the vicinity of the succeeding character or symbol to be generated is erased prior to the scanning of such vicinity by an electron beam.

Other objects and advantages of the present invention will become clear from the following detailed description of an embodiment thereof, and the novel features will be particularly pointed out in conjunction with the appended claims.

In accordance with this invention, pattern generator apparatus is provided wherein a plurality of pattern carrying films or plates having the requisite number of characters and symbols thereon and a plurality of associated flash tubes are positioned in light communication with the target face of an image pickup means having an electron beam scan, the plurality of associated flash tubes are adapted to be energized on a time division basis by digital signals applied thereto and said electron beam is adapted for prescanning and thereafter read scanning a predetermined portion of the target face of said image pickup tube in response to digital signals applied to the control means therefor.

The invention will be more clearly understood by reference to the following detailed description of an exemplary embodiment thereof in conjunction with the accompanying drawings, in which.

Figure 1:
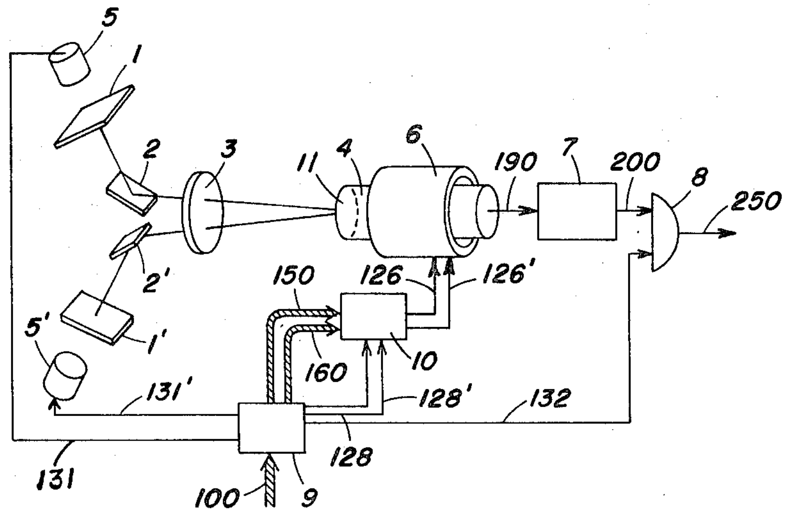
FIG. 1 is a schematic diagram illustrating an embodiment of the pattern generator apparatus according to the present invention.

Referring now to the drawings and more particularly to FIG. 1 thereof, there is shown an exemplary embodiment of the pattern generator apparatus according to the present invention. As shown in FIG. 1, the exemplary embodiment of the pattern generator means comprises a plurality of pattern carrying films 1 and 1′, image pickup means 4, amplifying and wave shaping circuit means 7, gate means 8, control circuit means 9 and deflection drive circuit means 10. The plurality of pattern carrying films 1 and 1′ may comprise a film or plate of material on which the necessary number of characters and symbols have been printed in matrix form. The plurality of pattern carrying films 1 and 1′ may be transparencies adapted for projection in the manner shown in FIG. 1, or alternatively may be opaque, whereby real images are obtained therefrom by reflection and the light sources therefor would be positioned in front of the plate. The plurality of pattern carrying films 1 and 1′ may have the characters and symbols printed thereon in a positive or negative form and each of the films 1 or 1′ generally comprises a number of characters and symbols equal to the total number of characters and symbols divided by the number of pattern carrying films 1 and 1′ which make up the plurality. It should be noted that only two pattern carrying films 1 and 1′ have been shown in the exemplary embodiment of FIG. 1 so that the simplicity of the disclosure and drawings may be maintained; however, in practicality, the number of pattern carrying films relied upon may be more than two in which case additional circuit components would be included in the same symmetrical relationship which now exists between the circuit components bearing regular digits as reference numerals and those bearing primed reference numerals. In this respect, it should be noted that when actual experiments were conducted with the embodiments of the present invention similar to that illustrated in FIG. 1, the use of six pattern carrying films in conjunction with systems requiring a large number of symbols and characters was found to be highly advantageous.

The pattern of characteristics and symbols present on each of the pattern carrying films 1 and 1′ are adapted to be focused on the target face 11 of the image pickup means 4. To accomplish this result, an optical system for each of the pattern carrying films 1 and 1′ is provided comprising a plane mirror 2 or 2′, respectively, and the common lens 3. As such, when either of the flash tubes 5 or 5′ which are operated on a time division basis by the control circuit means 9, described in further detail hereinafter, are energized, the entire pattern of symbols present on the pattern carrying films 1 or 1′, respectively, are focused on the target face 11 of the image pickup means 4 by the optical system therefor which has been prefocused.

The image pickup means 4, which is adapted to have the characters and symbols printed on each of the pattern carrying films 1 or 1′ focused upon the target face 11 thereof on a time division basis, as aforesaid, may take the form of any of the well-known class of photoelectric conversion devices wherein electron beam scanning is relied upon. However, as vidicon means comprise one of the simplest, most compact and least expensive members of the class of photoelectric conversion devices, the use of vidicon means is preferred and, accordingly, the image pickup means 4 illustrated in FIG. 1 takes the form of such vidicon means. The image pickup means 4, illustrated in FIG. 1 as vidicon means, consists of a highly evacuated envelope containing electron gun means, not shown, at one end and a transparent optical flat or target face 11 at the other. In the conventional manner, a thin electrically conductive layer, which is also light transparent, may be deposited on the inner surface of this target face 11 to act as a signal plate and a photoconductive film may be deposited on this layer so as to be responsive to the patterns focused thereon. The image pickup means 4 is provided with deflecting coil means 6 which acts in accordance with the digital signals applied thereto, as will be described hereinafter, to control the deflection of the electron beam which scans the target face 11 or more properly the photoconductive film associated therewith so that only the portion of the face 11 upon which the requisite character or symbol is focused will be scanned. Thus, the electrons deposited by the electron beam on the portion of the target upon face 11 which the desired character or symbol is focused will induce a current flow in the electrically conductive layer deposited on the target face 11 which signal is proportional to the rate of scan and the surface potential on the photoconductive film. Therefore, it will be seen that the image pickup means 4 acts in response to digital signals applied to the deflecting coil means 6 thereof to produce video signals representative of specified characters or symbols focused on the target face 11 thereof and thereby serves to translate such digital signals into signals representative of characteristic and symbolic information.

The output of the image pickup means 4 is applied over the conductor 190 to the amplifying and wave shaping circuit means 7. The amplifying and wave shaping circuit means 7 may comprise any of the well-known circuit means which is responsive to the presence of a video frequency signal to appropriately amplify such video signals and convert the same into a purely binary waveform. The output of the amplifying and wave shaping circuit means 7, which takes the form of a binary waveform representative of the image of the character or symbol scanned on the target face 11, is applied to the gate means 8 via the conductor 200. The gate means 8 may take the form of any of the conventional types of gating devices wherein a signal present at a first input thereof is passed to the output thereof upon the application of an enabling signal to a second input thereof. Thus, in the case of the gate means 8 illustrated in FIG. 1, the binary waveform present on conductor 200 is applied to the output 250 of the gate means 8 when enabling signals are applied to conductor 132, connected to the second input thereof, by the control circuit means 9. Therefore, as shall be seen hereinafter in conjunction with the operation of the FIG. 1 embodiment of the present invention, binary waveforms representative of the characters and symbols selectively scanned may be appropriately passed to utilization means, not shown, connected to the output 250 of the gate means 8, while any spurious signals generated by a prescan of a selected portion of the target face 11 to accomplish the erasure thereof will be blocked.

As the control circuit means 9 and the deflection drive circuit means 10 will be explained in detail in conjunction with FIG. 2, it will be sufficient at this point in the description of the FIG. 1 embodiment of the present invention to generally specify the function of each of these means and their electrical relationship within the pattern generator apparatus illustrated in FIG. 1. Accordingly, the control circuit means 9 acts in response to digital information supplied by a computer output connected to the input thereto, indicated at 100, to decode the binary signal portion of such digital information which designates the pattern carrying film 1 or 1′ to be projected and in accordance with such binary signal applies energizing potential to the flash tube 5 or 5′ over conductors 131 or 131′, respectively. In addition, the control circuit means 9 controls the prescanning and the read scanning performed at the target face 11 of the image pickup means 4 and establishes an appropriate timing relationship therefor by the application of digital information through conductors 150 and 160 to the deflection drive circuit means 10, sweep signals to the deflection drive circuit means 10 over conductors 128 and 128′ and enabling information to the gate means 8 over conductor 132. The deflection drive circuit means 10 in response to the digital information applied thereto by conductors 150 and 160, and the sweep signals applied thereto by conductors 128 and 128′, applies drive signals to the deflecting coil means 6 to thereby cause the electron beam present in the image pickup means 4 to prescan and read scan appropriate portions of the target face 11 upon which desired characters or symbols have been focused.

Figure 2:
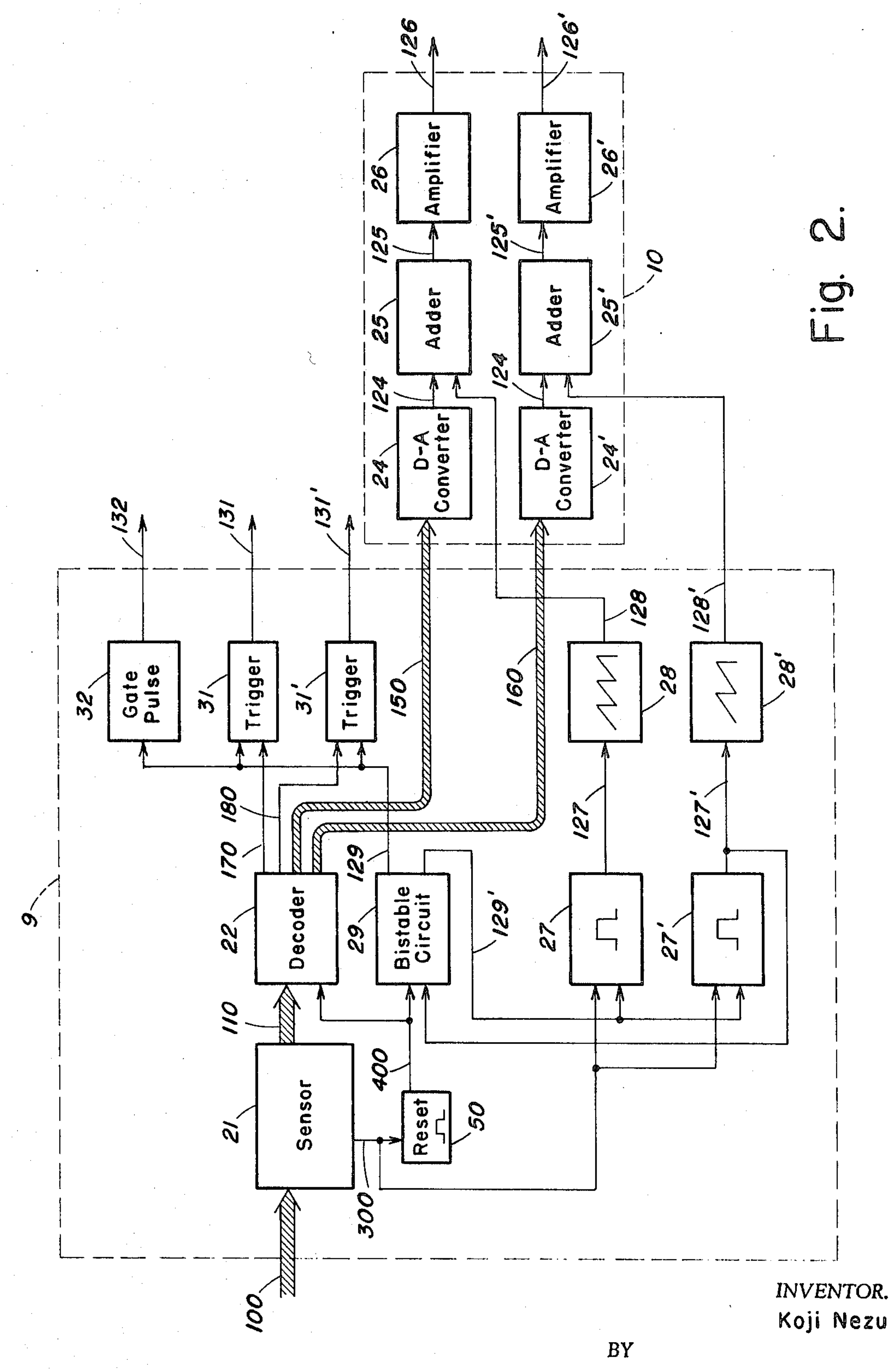
FIG. 2 is a block diagram of control circuit means and deflection drive circuit means suitable for use within the embodiment of the pattern generator apparatus illustrated in FIG. 1.
Figure 3A:
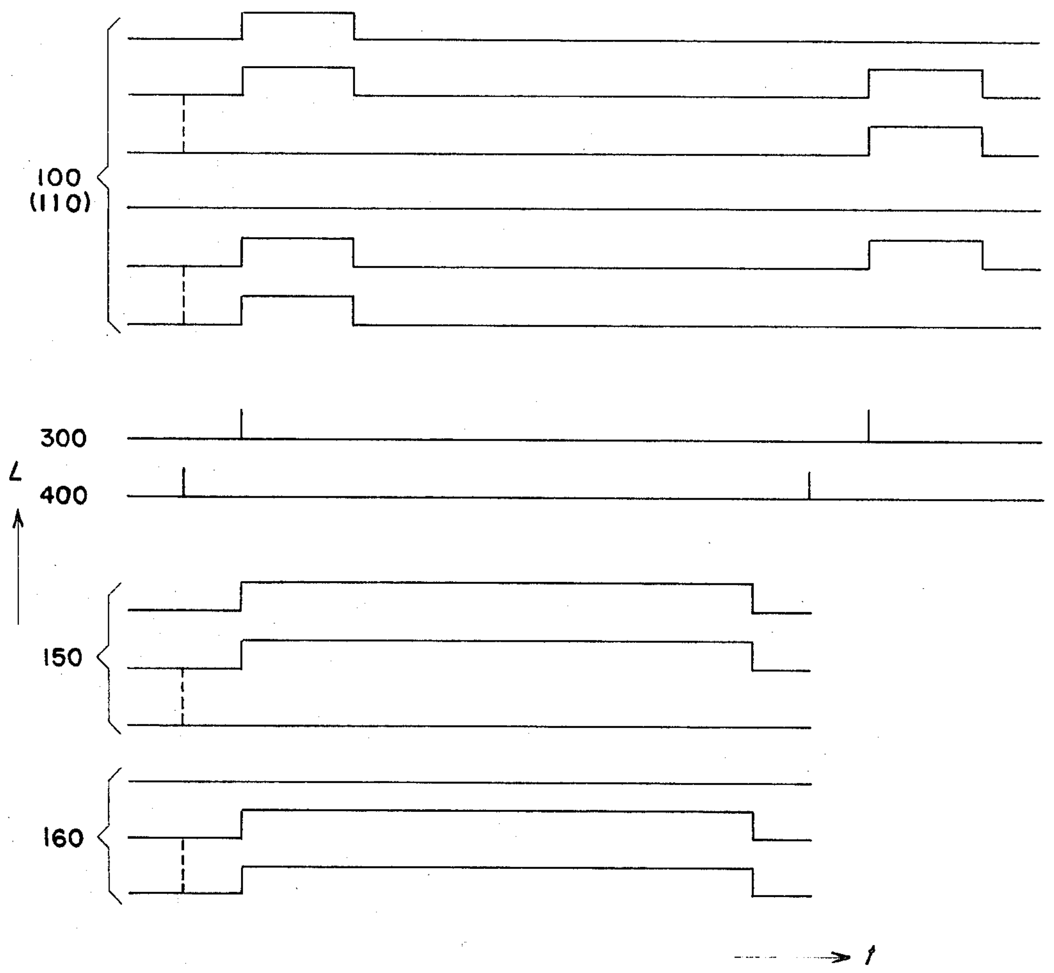
FIGS. 3A and 3B show timing charts illustrating the various waveforms produced by certain ones of the components illustrated in FIGS. 1 and 2.
Figure 3B:
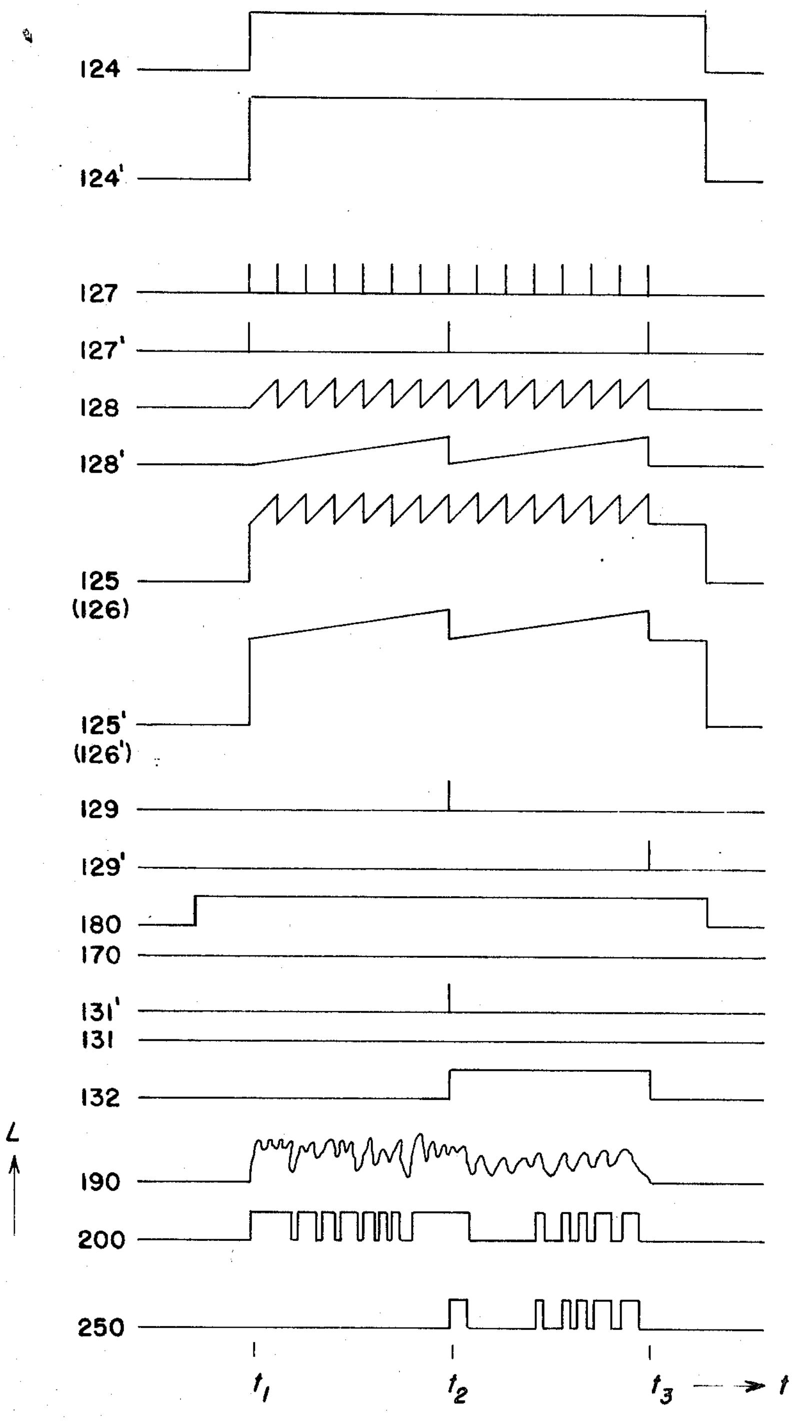

The operation of the FIG. 1 embodiment of the pattern generator apparatus according to the present invention is here briefly considered in order to obtain an overall view thereof prior to the detailed description of the control circuit means 9 and the deflection drive circuit means 10 illustrated in FIG. 2 and the detailed mode of operation engendered thereby as indicated by the waveforms illustrated in FIGS. 3A and 3B. In the discussion which follows, periodic reference will be made to the timing charts illustrated in FIGS. 3A and 3B and more particularly to the individual waveforms shown therein. The individual waveforms present in the timing charts illustrated in FIGS. 3A and 3B are representative of the waveforms of signals present at various conductors of the embodiment of the pattern generator apparatus according to the instant invention. Accordingly, in the timing charts illustrated in FIGS. 3A and 3B, the various waveforms depicted therein are identified by the reference numeral of the conductor on which they appear. In the timing charts shown in FIGS. 3A and 3B, the magnitude of the various waveforms illustrated therein is represented by the ordinate values, while relative time is indicated along the abscissa.

Briefly, in the operation of the embodiment of the pattern generator apparatus depicted in FIG. 1, the input 100 to the control circuit means 9 may be considered to comprise a cable consisting of a plurality of parallel wires interconnecting the output of a digital computer, not shown herein, with the input means of the control circuit means 9. The digital information supplied to the input 100 of the control circuit means 9 will comprise the parallel binary signal outputs of such a digital computer and is indicated generally by the top six waveforms of FIG. 3A, annotated 100. The control circuit means 9 upon receipt of the digital information applied in parallel to the input 100 thereof will function to decode the binary signal portion thereof that indicates which of the pattern carrying films 1 or 1′ is to be projected onto the target face 11 of the image pickup means 4 and appropriately utilize these signals to allow the subsequent energization of the flash tube 5 or 5′ to thus accomplish the requisite projection of one of said pattern carrying films 1 or 1′. Thus, if it is assumed that the pattern carrying film 1′ is to be subsequently projected on the target face 11, as indicated by waveform 131′ of FIG. 3B, a narrow width pulse is applied to conductor 131′ about midway in the timing cycle to energize the flash tube means 5′ and hence project the pattern present on pattern carrying film 1′ on the target face 11.

Furthermore, when the incoming digital information applied to input 100 is sensed by the control circuit means 9, X and Y scanning generator means present in the control circuit means 9, as fully described below, causes the generation of X and Y sweep signals. The X and Y sweep signals thus generated in the control circuit means 9, as shown by waveforms 128 and 128′, respectively, of FIG. 3B, are applied to the deflection drive circuit means 10 over lines 128 and 128′, respectively. In addition to the binary signal portion of the digital information applied to the control circuit means 9 which is representative of the pattern carrying film 1 or 1′ to be projected, the remainder of such digital information is indicative of the X and Y coordinate values of the portion of the target face 11 on which the desired character or symbol will be focused. Accordingly, this portion of the parallel digital information applied to the control circuit means 9 is applied over cables 150 and 160, as indicated by waveforms 150 and 160 of FIG. 3A, to the deflection drive circuit means 10. The portion of the parallel digital information applied by cables 150 and 160 to the deflection drive circuit means 10 undergo digital-to-analogue conversion thereat, as indicated by waveforms 124 and 124′ of FIG. 3B, and thereafter are added to the X and Y sweep signals applied, as aforesaid, to the deflection drive circuit means 10. The outputs of the deflection drive circuit means 10 which represent the sums of the converted X and Y coordinate values and the X and Y sweep signals, as indicated by waveforms 126 and 126′ of FIG. 3B, are applied to the deflecting coil means 6 to thereby cause the electron beam of the image pickup means 4 to scan a discrete portion of the target face 11 or more properly the photoconductive film associated therewith.

As may be seen by an inspection of the waveforms 128′ and 126′ illustrated in the timing chart of FIG. 3B, the Y sweep signals produced by the control circuit means 9 and supplied to the deflection drive circuit means 10 are generated twice for each application of digital information to the input 100 of the control circuit means 9. The first portion of the sawtooth waveform comprising the Y sweep signals produced is relied upon to accomplish the prescanning of the selected portion of the target face of image pickup means 4 by the electron beam while the second portion of said sawtooth waveform is utilized to effect the read scanning of such selected portion. Thus, the portions of the parallel digital information which are indicative of the X and Y coordinate values of the portion of the target face 11 on which the desired character or symbol will be focused undergo digital-to-analogue conversion and are added to the X and Y sweep signals, respectively, so that the signals, as represented by the waveforms 126 and 126′ of FIG. 3B, applied to the deflecting coil means 6 by the deflection drive circuit means 10 at time $t_1$ will cause the electron beam of the image pickup means 4 to prescan the requisite area of the target face 11 defined thereby. Subsequently, at time $t_2$, which is coincident with the second portion of the Y sweep signal produced, as indicated by waveform 128' of FIG. 3B, the control circuit means 9 will apply a narrow width pulse to conductor 131', as shown by waveform 131' in FIG. 3B, to thereby energize the flash tube 5'. Similarly, at time $t_2$, the control circuit means 9 will also apply an enabling pulse to conductor 132, as shown by waveform 132 in FIG. 3B, to thus allow the gate means 8 to pass input signals, applied thereto by conductor 200, to its output 250.

When the short duration energizing pulse, as shown by waveform 131' in FIG. 3B, is applied by the control circuit means 9 to the flash tube 5', the flash tube 5' will ignite for a brief period during which the entire pattern present on the pattern carrying film 1' will be focused through the optical system comprising the plane mirror means 2' and the lens means 3 onto the target face 11 of the image pickup means 4. As the area of the target face 11 upon which the desired character or symbol is focused has already been erased by the prescanning thereof during the interval I$t_1$—$t_2$, the desired character or symbol focused thereon may now be scanned by the electron beam, under the direction of the signals applied to the conductors 126 and 126', without fear of distortion due to the presence of a residual image in such area. Accordingly, the electron beam scanning of the character or symbol focused on the selected area of the target face 11 will induce video signals in the conductor 190 connected to the output of the image pickup means 4 which is substantially binary in form and is representative of the character or symbol scanned. The video signal thus induced in the conductor 190 connected to the output of the image pickup means 4, as illustrated by waveform 190 of FIG. 3B, is applied thereby to the input of the amplifying and wave shaping circuit means 7 whereat such video signal receives suitable amplification and is shaped into a purely binary waveform as indicated by the waveform 200 illustrated in FIG. 3B. The output of the amplifying and wave shaping circuit means 7 is applied by the conductor 200 to the first input of the gate means 8. As the gate means 8 was previously inabled at time $t_2$ by a signal applied to the second input thereto on conductor 132, the pure binary waveform representative of the character or symbol scanned by the electron beam, will be passed to the output 250 of the gate means 8, as shown by waveform 250 of FIG. 3B, whereat such signal will be available for application to utilization means connected thereto. Accordingly, it will be seen that during the time interval $t_2$—$t_3$, video signals representative of the character or symbol scanned will be present at the output 250 of the gate means 8. However, it should be additionally noted in respect to waveforms 200 and 250 of FIG. 3B, wherein the former waveform is representative of the output of the amplifying and wave shaping circuit means 7, while the latter waveform is representative of the output of the gate means 8, that during the time interval $t_1$—$t_2$, although video signals representative of residual images formed on the selected area of the target face 11 may, when prescanning occurs, generative device signals representative thereof, such video signals will not be made available at the output 250 of the gate means 8 because the gate means 8 is not enabled. Therefore, it will be appreciated that the embodiment of the pattern generator apparatus illustrated in FIG. 1 acts upon the receipt of digital information to translate such digital information into characteristic or symbolic information representative thereof. Furthermore, as the image pickup means 4 utilized in the embodiment of the pattern generator apparatus of FIG. 1 relies expressly on electron beam scanning techniques, such image pickup means 4 may comprise inexpensive and compact forms thereof such as vidicon means.

FIG. 2 is a block diagram illustrating control circuit means 9 and deflection drive circuit means 10 suitable for use within the embodiment of the pattern generator apparatus illustrated in FIG. 1. In FIG. 2 the various circuit components present within the control circuit means 9 and the deflection drive circuit means 10 are enclosed respectively within the appropriately annotated dashed blocks 9 and 10 so that the individual nature of each these circuit means may be appreciated while the cooperative relationship among each of the circuit components present therein is readily apparent. As shown in FIG. 2, the control circuit means 9 comprises binary signal sensing means 21, reset pulse generator means 50, decoder means 22, bistable circuit means 29, X and Y scanning pulse generator means 27 and 27' respectively, X and Y sweep generator means 28 and 28' respectively, trigger circuit means 31 and 31' and gate pulse generator means 32. Similarly, as shown in FIG. 2, the deflection drive circuit means 10 includes X and Y coordinate digital-to-analogue converter means 24 and 24' respectively, X and Y adder means 25 and 25' respectively and X and Y deflection amplifier means 26 and 26' respectively. The binary signal sensing means 21 may comprise any of the well-known circuit means which are responsive to one of a plurality of parallel binary signals to produce a pulse indicative of the presence of such a binary signal. Accordingly, the cable 100, which as aforesaid may comprise a plurality of parallel wires interconnecting the output of a digital computer, not shown, with an embodiment of the pattern generator apparatus according to this invention, is connected to the input of the binary signal sensing means 21 and therefore applies to said binary signal sensing means 21 digital information taking the form of a plurality of parallel binary signals as shown by the waveforms 100 of FIG. 3A. In response to the presence of said digital information, the binary signal sensing means 21 will generate a narrow width pulse, as indicated by waveform 300 of FIG. 3A, and apply the same to conductor 300. The digital information applied to the binary sensing means 21 is applied thereby over cable 110 in the identical form in which it was received, as indicated by waveform 110, to the input of the decoder means 22. The cable 110 may be similar to the cable 100 wherein said cable 110 includes a plurality of parallel wires interconnecting the outputs of the binary signal sensing means 21 with the inputs to the decoder means 22. The decoder means 22 may take any of the conventional circuit configurations which will respond to a designated one or more of a plurality of parallel binary signals applied thereto such that one of two possible outputs are energized in response to the binary state of such designated one or more binary signals. Accordingly, the decoder means 22 in response to the plurality of parallel binary signals applied to the inputs thereof by cable 110 will respond to the binary state of one or two of the said plurality of parallel binary signals to apply a pulse to one of the output conductors 170 or 180 thereof. The binary signals thus acted upon by the decoder means 22 contain information designating the particular pattern carrying film 1 or 1', as shown in FIG. 1, to be projected. Hence, the output conductor 170 or 180 energized in response to the binary state of such binary signals is indicative of the flash tube 5 or 5' to be energized. The output conductors 170 and 180 are connected to the trigger circuit means 31 and 31' respectively. The trigger circuit means 31 and 31' each comprises devices capable of generating an output pulse in response to the coincident energization of the inputs thereto. Therefore, if either of the output conductors 170 or 180 connected to a first input of the trigger circuit means 31 or 31', respectively, are energized at a time when the line 129, which is commonly connected to each of the second inputs to the trigger circuit means 31 and 31', is energized in a manner to be described hereinafter, an output pulse will be produced by the coincident energization of trigger circuit means 31 or 31' and will be applied to the output conductor 131 or 131', respectively. The output conductors 131 and 131' of the trigger circuit means 31 and 31', respectively, are connected to the flash tubes 5 and 5' in the manner illustrated in FIG. 1. Thus, if it is again assumed that the digital information applied to the input of the decoder means 23 designates that the pattern carrying film 1' is to be projected, the decoder means 22 will apply a pulse to output conductor 180, as shown by waveform 180 in FIG. 3B, and upon the application of a second input to the trigger circuit means 31' by the line 129, as shown by waveform 129 in FIG. 3B, the trigger circuit means 31' will apply a narrow width pulse to output conductor 131', shown by waveform 131' in FIG. 3B, to thereby accomplish the short duration energization of flash tube 5'.

As the plurality of parallel binary signals applied to the decoder means 22, which are not indicative of the pattern carrying film 1 or 1' to be projected, are representative of the X and Y coordinate values of the area of the target face 11 of the image pickup means 4 to be scanned by the electron beam, the remainder of the plurality of parallel binary signals are separated by the decoder means into X coordinate values and Y coordinate values. The plurality of binary signals thus separated into X and Y coordinate values by the decoder means 22 are applied to the cables 150 and 160, respectively, such that the parallel binary signals present in cable 150, as shown by waveform 150 of FIG. 3A, are representative of the X coordinate value of the selected area of the target face 11 to be scanned while the parallel binary signals present in cable 160, as illustrated by waveform 160 of FIG. 3A, are representative of the Y coordinate value of the selected area to be scanned. The cables 150 and 160, which may again comprise a plurality of parallel wires, are connected to the X and Y coordinate digital-to-analogue converter means 24 and 24', respectively. The X and Y coordinate digital-to-analogue converter means 24 and 24' each may comprise any of the well-known class of such devices which function to convert a plurality of inputs applied thereto into a single serial waveform. Accordingly, the plurality of parallel binary signals applied by the cable 150 to the X coordinate digital-to-analogue converter means 24 are converted thereby into a serial analogue signal, as indicated by the waveform 124 illustrated in FIG. 3B, which is applied to conductor 124. Similarly, the plurality of parallel binary signals applied by the cable 160 to the Y coordinate digital-to-analogue converter means 24' are converted into a serial analogue signal, represented by waveform 124' shown in FIG. 3B, which is applied to the conductor 124'. The conductors 124 and 124' are each connected to a first input of the X and Y adder means 25 and 25' respectively.

Returning now to the binary signal sensing means 21, it will be seen that the conductor 300, to which a narrow width pulse is supplied by the binary sensing means 21, is connected to the reset pulse generator means 50, and the X and Y scanning pulse generator means 27 and 27', respectively. The reset pulse generator means 50 may take the form of a pulse generator device which acts after a predetermined time interval to generate an output pulse in response to an input pulse applied thereto. In the instant case, the reset pulse generator means acts in response to the narrow width pulse supplied thereto by the conductor 300 to delay such narrow width pulse for a time interval which is highly shorter than the repetition period of the plurality of parallel binary signals applied by the cable 100 to the binary sensing circuit means 21, and thereafter, to apply a similar narrow width pulse to the conductor 400 connected to the output thereof. The timing relationship between the narrow width pulse received by the reset pulse generator means 50 and the narrow width pulse generated thereby may be appreciated by a comparison of the waveforms 300 and 400 illustrated in FIG. 3A. As is evident from a comparison of narrow width pulses generated and received by the reset pulse generator means 50, a delay or buffering means may be relied upon in place of the reset pulse generator means 50 as no actual regeneration of the input pulse received thereby is in fact necessary. The conductor 400 connected to the output of the reset pulse generator means 50 is connected to a reset input of the bistable circuit means 29. As shall be seen hereinafter, the bistable circuit means 29, which may comprise a flip-flop or other similar bistable means having complementary outputs, is reset prior to each input of digital information by cable means 100 so that a predetermined reference condition of the bistable circuit means 29 may be assured prior to the initiation of each of the prescanning and read scanning cycles of operation.

The X and Y scanning pulse generator means 27 and 27' respectively may each comprise oscillator means which, in the well-known manner, are driven into oscillation at a predetermined frequency in response to an initiating pulse input applied thereto at a first input thereof and will be driven out of oscillation by a reset pulse applied to a second input thereof. The pulse repetition frequency of the X scanning pulse generator means 27 may be designed for a value of 16 kHz. while the pulse repetition frequency of the Y scanning pulse generator means 27' may be designed for a value of 0.4 kHz. These values of frequency are selected so that the ratio of the two repetition frequencies will be of an appropriate value when the number of read scanning lines necessary for read scanning the area of the image formed by one character or symbol on the target face 11 is considered. Accordingly, as each of the X and Y scanning pulse generator means 27 and 27' respectively receive at first inputs thereto the narrow width pulse applied to the conductor 300 by the binary sensing means 21, as the conductor 300 is connected in parallel thereto, the X and Y scanning pulse generator means are driven into oscillation by such narrow width pulse to produce at the outputs thereof, respectively, the signals illustrated by waveforms 127 and 127' of FIG. 3B. The outputs of the X and Y scanning pulse generator means 27 and 27' are connected to conductors 127 and 127', respectively, and each of said X and Y scanning pulse generator means 27 and 27' will continue to generate the previously described waveforms until a reset pulse is applied to the second inputs thereto connected in parallel to conductor 129'. The conductors 127 are 127' are connected to the X and Y sweep generator means 28 and 28', respectively and in addition thereto a portion of the output of the Y scanning pulse generator means 27', shown as waveform 127' in FIG. 3B, as present on conductor 127' is applied to the trigger input of the bistable circuit means 29 in the manner shown.

The X and Y sweep generator means 28 and 28' each may comprise sawtooth generators or similarly well-known means which act in response to each input pulse applied thereto to generate a ramp function signal such that the overall signal produced thereby represents a sawtooth. Therefore, in response to the 16 kHz. pulses applied by conductor 127 to the X sweep generator means 28, a sawtooth, signal having a repetition rate of 16 kHz. as shown by waveform 128 of FIG. 3B, will be generated by said X sweep generator means 28 and thus applied to the conductor 128 connected thereto. Similarly, in response to the 0.4 kHz. pulses applied by conductor 127' to the Y sweep generator means 28', a sawtooth signal having a repetition rate of 0.4 kHz. as shown by the waveform 128' of FIG. 3B, will be generated by the y sweep generator means 28' and applied to the conductor 128' connected thereto. The conductors 128 and 128' are each connected to the X and Y adder means 25 and 25', respectively at the second inputs thereto. The X and Y adder means 25 and 25' may each take the form of any of the well-known class of devices which respond to two or more input signals applied thereto to produce an output signal equal to the algebraic sum of such two or more input signals. Therefore, the X adder means 25 will respond to the output of the X coordinate digital-to-analogue converter means 24 applied by the conductor 124 to a first input thereto and the output of the X sweep generator means 28 applied over conductor 128 to a second input thereto to produce an output signal, as shown by waveform 125 of FIG. 3B, representative of the sum of signals applied to the first and second inputs thereof. In similar manner the Y adder means 25' will respond to the output of the Y coordinate digital-to-analogue means 24' applied by the conductor 124' to a first input thereto and the output of the Y sweep generator means 28' applied over conductor 128' to a second input thereto to produce an output signal, as shown by waveform 125' of FIG. 3B, representative of the sum of the signals applied as inputs thereto. The output signals of the X and Y adder means 25 and 25' are applied to the conductors 125 and 125', respectively, while the conductors 125 and 125' are each connected to the input terminal of the X and Y deflection amplifier means 26 and 26' respectively. The X and Y deflection amplifier means 26 and 26' may comprise any of the well-known forms of amplifying devices capable of applying an appropriate gain to video signals applied thereto. The output signals of the X and Y adder means 25 and 25' as applied to the conductors 125 and 125' thus undergo suitable amplification at the X and Y deflection amplifier means 26 and 26'. The suitably amplified outputs of the X and Y deflection amplifier means 26 and 26' are applied to conductors 126 and 126', respectively, which are connected to the deflection coil means 6 illustrated in FIG. 1.

The bistable circuit means 29, as aforesaid, may comprise a flip-flop circuit whose complementary outputs are connected respectively to separate differentiating circuit means present therein. The bistable circuit means 29 is provided with a reset input which is connected to conductor 400 so that the delayed narrow width pulse applied to conductor 400 by the reset pulse generator means 50 is coupled thereto. As previously mentioned, the narrow width pulse supplied to the conductor 400 and thereby coupled to the reset input of the bistable circuit means 29, at a time just prior to the initiation of a new sequence of digital information. In addition, as previously stated, the trigger input of the bistable circuit means 29 is connected in the manner shown to the conductor 127' to thus receive thereat the pulsed 0.4 kHz. output of the Y scanning pulse generator 27. Accordingly, if the predetermined reference condition of the bistable circuit means 29 is assumed, the second pulse received at the trigger input of the bistable circuit means 29 will cause a pulse to be provided at the first output of the bistable circuit means 29 to which the conductor 129 is connected, while the third pulse received at said trigger circuit input will cause a pulse to be produced at the second complementary output thereof to which the conductor 129' is connected. The relationship between the input pulses applied to the trigger circuit of the binary circuit means 29 and the complementary outputs thereof are illustrated by waveforms 127', 129 and 129' of the timing chart of FIG. 3B. As was described above, the conductor 129 is connected in the manner illustrated in the second inputs of the trigger circuit means 31 and 31'. In addition, the conductor 129 is also connected to the input of the gate pulse generator means 32. The gate pulse generator means 32 may take the form of any of the well-known class of devices which respond to an input signal applied thereto to produce an output pulse. The output of the gate pulse generator 32 is connected to the second input of the gate means 8 in the manner illustrated in FIG. 1. Accordingly, it will be seen that when the bistable circuit means 29 applies a pulse to the conductor 129, the second inputs of the trigger circuit means 31 and 31' are energized and, in addition thereto, the gate pulse generator means 32 is energized. Under these conditions, the gate pulse generator means 32 will apply the pulse indicated in waveform 132 of FIG. 3B to conductor 132 to thereby energize gate means 8 while the trigger means 31 or 31' having a pulse applied thereto by conductors 170 and 180, respectively, will produce an output to thereby energize the flash tube connected thereto. Thus, if conditions previously assumed are maintained, wherein the pattern carrying film 1' is to be projected, a pulse will be applied to the first input of the trigger circuit means 31' by conductor 180, as shown by waveform 180 of FIG. 3B, and the trigger circuit means 31' will generate the pulse indicated by waveform 131' in FIG. 3B upon receipt of the pulse present in conductor 129 to thereby energize the flash tube 5'.

When the third pulse is received by the trigger input of the bistable circuit means 29, the bistable circuit means 29 will produce a pulse, as shown by waveform 129' of FIG. 3B at the second, complementary output thereof to which the conductor 129' is connected. The conductor 129' is additionally connected to each of the second inputs of the X and Y scanning pulse generator means 27 and 27' respectively. Accordingly, as pulses applied to the second inputs of each of the X and Y scanning pulse generator means 27 and 27' respectively will drive such scanning pulse generator means out of oscillation as aforesaid, when the bistable circuit means 29 applies a pulse to the conductor 129' connected to the complementary, second output thereof, this pulse will be coupled to the second inputs of said X and Y scanning pulse generator means 27 and 27' whereby each of said pulse generator means are driven out of oscillation.

In the operation of the control circuit means 9 and the deflection drive circuit means 10, the digital information applied by the digital computer to the binary signal sensing means 21 over the cable 100 is sensed by said binary signal sensing means 21 and in response thereto the narrow width pulse shown in waveform 300 of FIG. 3A is applied to the conductor 300. The digital information applied to the binary sensing means 21 is applied without any change therein, as shown by waveform 110 of FIG. 3A of the decoder means 22 via the cable 110. As previously stated, the digital information received from the digital computer comprises a plurality of parallel binary signals wherein one or more of said binary signals carry information which designates the particular pattern carrying film 1 or 1' to be projected while the remainder of such binary signals contain information designating the particular area of the target face 11 of the image pickup means 4 to be scanned. The one or more binary signals which include information designating the particular pattern carrying film 1 or 1' to be projected are detected by the decoder means 22 and, depending upon the state of such binary signals, the output conductor 170 or 180 is energized. Thus, if the pattern carrying film 1 is to be projected, the output conductor 170 is energized while, if the pattern carrying film 1' is to be projected, the output conductor 180 is energized. In the instant description, as it is assumed that the pattern carrying film 1' is to be projected, the waveforms 170 and 180 illustrated in FIG. 3B clearly indicate that the output conductor 180 has been energized by the decoder means 22 while the output conductor 170 is maintained in a deenergized condition. The output conductors 170 and 180 are connected, as aforesaid, to the first inputs of the trigger circuit means 31 and 31' respectively. Therefore, when the trigger circuit means 31 and 31' are enabled, in a manner to be hereinafter described, by a pulse present on conductor 129, which is connected in parallel with the second inputs thereto, the trigger circuit means 31 or 31' having its first input energized by the output conductor 170 or 180, respectively, connected thereto will produce a narrow width pulse at the output thereof. As the conductors 131 and 131' are connected to the outputs of the trigger circuit means 31 and 31', respectively, and in addition thereto are connected to the flash tubes 5 and 5', respectively, as shown in FIG. 1, a thus enabled trigger circuit means 31 or 31' will generate a narrow width pulse to thereby energize the flash tube 5 or 5' connected thereto. The narrow width pulse generated by trigger circuit means 31' to thereby energize the flash tube 5' and hence project the pattern carrying film 1' is illustrated by waveform 131' in FIG. 3B.

As the remainder of the plurality of parallel binary signals applied to the decoder means 22 contain information representative of the particular area of the target face 11 of the image pickup means 4 to be scanned, the remainder of the plurality of parallel binary signals are separated by the decoder means into X coordinate values and Y coordinate values. The plurality of the parallel binary signals, thus separated as to X and Y coordinate values by the decoder means 22, are applied thereby to the cables 150 and 160 such that the parallel binary signals present in cable 150, as shown by waveform 150 of FIG. 3A, are representative of the X coordinate value of the selected area of the target face 11 to be scanned while the parallel binary signals present in the cable 160, as illustrated by waveform 160 of FIG. 3A, are representative of the Y coordinate value of the selected area to be scanned. The thus separated plurality of parallel binary signals are applied by the cables 150 and 160 to the X and Y coordinate digitalvto-analogue converter means 24 and 24', respectively, whereat, as aforesaid, such plurality of parallel binary signals are converted respectively into single serial waveforms as illustrated by waveforms 124 and 124' of FIG. 3B. The outputs of the X and Y coordinate digital-to-analogue converter means 24 and 24' are applied over conductors 124 and 124', respectively, to the first inputs of the X and Y adder means 25 and 25'. Therefore, it will be seen that during time interval $t_1$—$t_3$, as shown in FIG. 3B, the X and Y adder means 25 and 25' receive a serial waveform, as indicated by waveforms 124 and 124' of FIG. 3B, which is representative of the X and Y coordinate, respectively, of the designated area of target face 11 to be scanned.

Returning now to the binary sensing means 21, the narrow width pulse generated thereby in response the application of digital information thereto, as indicated by the waveform 300 in FIG. 3A, will be applied to the reset pulse generator means 50 and the X and Y scanning pulse generator means 27 and 27' respectively. When the narrow width pulse generated by the binary sensing means 21 is received at the first inputs to the X and Y scanning pulse generator means 27 and 27', the X and Y scanning pulse generator means 27 and 27' will be driven into oscillation thereby, as aforesaid, whereby the X scanning pulse generator means 27 will produce the 16 kHz. pulse train illustrated by waveform 127 in FIG. 3B and the Y scanning pulse generator means 27' will produce the 0.4 kHz. pulse train indicated by waveform 127' in FIG. 3B. The output signal produced by the X scanning pulse generator means 27 is applied through conductor 127 to the X sweep generator means 28 while the output signal produced by the Y scanning pulse generator means 27' is applied via conductor 127' to the Y sweep generator means 28'. In response to the input signals applied thereto, the X and Y sweep generator means 28 and 28' will generate the sawtooth waveforms illustrated by waveforms 128 and 128', respectively, of FIG. 3B, which sawtooth waveforms have repetition rates of 16 kHz. and 0.4 kHz., respectively. The output waveforms of the X and Y sweep generator means 28 and 28' are applied to the second inputs of the X and Y adder means 25 and 25', respectively. As the outputs of the X sweep generator means 28 controls the vertical extent of the scanning while the output of the Y sweep generator means controls the horizontal distance scanned, it will be seen that the second inputs to the X and Y adder means 25 and 25' receive information denoting the metes and bounds of the area to be scanned on the target face 11 of the image pickup tube 4. The outputs of the X and Y sweep generator means 28 and 28' are illustrated, as aforesaid, by the waveforms 128 and 128', respectively, of FIG. 3B. Thus, as will be seen by an inspection of the waveforms 128 and 128' illustrated in the timing chart of FIG. 3B, the output signals of the X and Y sweep generator means 28 and 28' are received at the second input to the X and Y adder means 25 and 25', respectively, during the time interval $t_1$—$t_3$ *and that the prescanning time interval defined by the output of the Y sweep generator means 28', as shown by waveform 128', resides in the time interval* $t_1$—$t_2$ while the read scanning time interval defined by the second pulse of the sawtooth waveform of the output of the Y sweep generator means 28' resides between $t_2$ and $t_3$.

Thus, as the first inputs to the X and Y adder means 25 and 25' each receives signal information during the time interval $t_1$—$t_3$ which is indicative of the X and Y coordinates, respectively, of the designated area of the target face 11 to be scanned, and the second inputs to the X and Y adder means 25 and 25' each receives signal information during the time interval $t_1$—$t_3$ defining the vertical and horizontal extents, respectively, to be prescanned and read scanned, it will be apparent that the sum of such first and second inputs as present at the outputs of the X and Y adder means 25 and 25' is definitive of the precise area to be prescanned and read scanned during the time interval $t_1$—$t_3$. The outputs of the X and Y adder means 25 and 25' are illustrated as waveforms 125 and 125' of FIG. 3B. As previously mentioned, the outputs of the X and Y adder means 25 and 25' are appropriately amplified by the X and Y deflection amplifier means 26 and 26', respectively, and applied to the deflection coil means 6 illustrated in FIG. 1.

As was stated above, the narrow width pulse applied to the conductor 300 by the binary sensing means 21 is applied to the reset pulse generator means 50 as well as the X and Y scanning pulse generator means 27 and 27'. The reset pulse generator means 50 will respond to the receipt of said narrow width pulse, in the manner described above, to apply a reset pulse, as shown by the waveform 400 in FIG. 3A, to the bistable circuit means 29, at a time just prior to the succeeding application of digital information to the binary sensing means 21. Accordingly, as aforesaid, since the bistable circuit means 29 is always reset to a predetermined reference condition just prior to the receipt of digital information which initiates a new scanning operation, the consistent response of the bistable circuit means 29 will be assured. Therefore, when the output of the Y scanning pulse generator means 27' is applied to the trigger input of the bistable circuit means 29, the second pulse therein applied to the trigger input of the bistable circuit means 29 will switch said bistable circuit means 29 to thereby produce a pulse on the conductor 129 connected to a first output thereof while the third pulse present in the output of the Y scanning means 27' will again switch said bistable circuit means 29 to thereby produce a pulse on the conductor 129' connected to a second, complementary output of said bistable circuit means 29. As was previously described above, the presence of an output pulse on line 129 will enable the trigger circuit means 31 or 31' which has its first input energized by conductors 170 or 180, in the assumed case trigger circuit means 31', and in addition thereto will cause the gate pulse generator means 32 to provide an enabling pulse to the gate means 8 illustrated in FIG. 1. Furthermore, the presence of an output pulse on conductor 129', which is connected to the second, complementary output of the binary circuit means 29, will in the manner previously described, drive the X and Y scanning pulse generator means 28 and 28', respectively, out of oscillation to thereby deenergize the scanning portion of the apparatus depicted in FIG. 2.

The timing sequence in which the above-defined events occur may be fully appreciated by an inspection of the timing chart illustrated in FIG. 3B. Therefore, as indicated by waveform 127', the second input pulse applied to the trigger input of the binary circuit means 29 corresponds in time ($t_2$) to the termination of the prescanning time interval $t_1$—$t_2$, as defined by the first pulse of waveform 128' which represents the output of the Y sweep generator means 28'. Accordingly, as a first pulse, shown by waveform 129, is not present at the first output of the bistable circuit means until time $t_2$; the trigger pulse, waveform 131', relied upon to energize flash tube 5' and the gate enabling pulse waveform 132, are not initiated until time $t_2$ when the prescanning interval $t_1$—$t_2$ has terminated. Thus, despite the presence of a residual image on the selected area of the target face 11 which is prescanned; the spurious signals induced thereby, waveforms 190 and 200 between the times $t_1$ and $t_2$, will not be coupled to the output 250, waveform 250, of the embodiment of the pattern generator apparatus depicted in FIG. 1 due to the gate means 8. In addition, the third input pulse, waveform 127', applied to the binary circuit means 29 will cause an output pulse, waveform 129', to be applied to the conductor 129 at time $t_3$ to thereby terminate the output oscillations of the X and Y scanning pulse generator means 27 and 27' after the read scanning interval, the second pulse of waveform 128', has terminated. Therefore, it will be seen that the prescanning operation is completed prior to the energization of the flash tubes 5 or 5', the projection of the requisite pattern carrying film 1 or 1' and the enabling of gate means 8 so that any spurious output due to the prescanning of a residual image on the desired area of the target face 11 of the image pickup tube 4 will not be present at the output of the described embodiment of the pattern generator apparatus according to the present invention.

Figure 4:
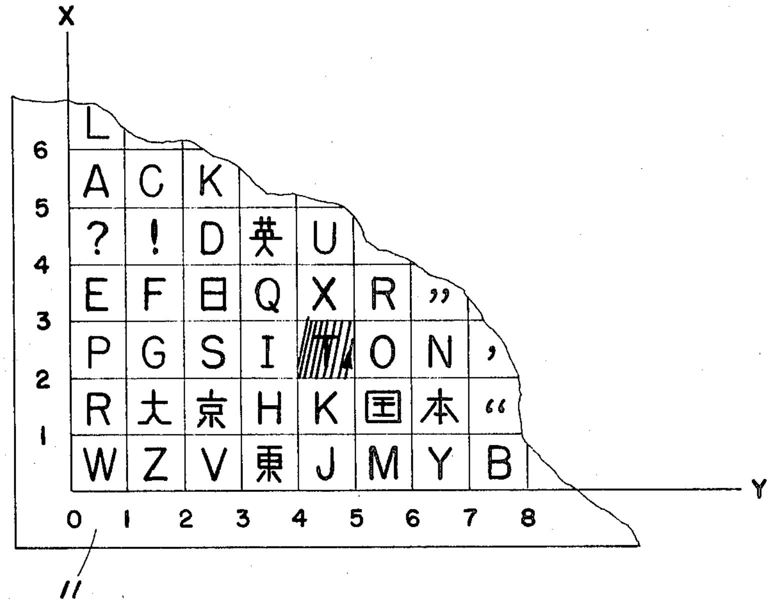
FIG. 4 is a diagram of a portion of a real image projected from a pattern carrying film or plate onto the target face of the image pickup means illustrated in the embodiment of the invention shown in FIG. 1.

FIG. 4 illustrates a diagram of a portion of a real image selectively projected from a pattern carrying film onto the target face of the image pickup means relied upon in the embodiment of the pattern generator apparatus depicted in FIG. 1. As is apparent from the nature of the photoconductive film upon which a projected image is actually formed, the image focused thereon will persist for a short period of time after projection has terminated thereby forming a residual image which requires the erasing, prescanning techniques adopted by the present invention. The prescanning and read scanning of a particular area are accomplished as aforesaid by the outputs of the X and Y deflection amplifier means, as indicated by waveforms 126 and 126' respectively of FIG. 3B, applied to the deflection coil means 6. This prescanning and read scanning as directed by waveforms 126 and 126' of FIG. 3B is performed in response to the sawtooth sweep signals, indicated by waveforms 128 and 128' of FIG. 3B, generated by the X and Y sweep generator means 28 and 28'. The mode in which the prescanning and read scanning is accomplished is illustrated in FIG. 4. Thus, if the letter T shown in FIG. 4 is considered, it will be seen that the prescanning or read scanning, as indicated by the trace waveform superimposed upon the letter T, proceeds in the horizontal direction and is initiated at the lower left of the area to be scanned.

As will be seen from the foregoing, the pattern generator apparatus according to the present invention carries out the translation of digital information into characteristic or symbolic information by the utilization of image pickup means which relies upon electron beam scanning so that the compact nature and substantial economy exhibited by such image pickup means may inure to the overall benefit to the pattern generator apparatus according to the present invention. Furthermore, as only the area of the target face of the image pickup means upon which the desired character or symbol is focused is prescanned, the pattern generator apparatus of the instant invention is capable of high speed generation. For instance, in an actual embodiment of the pattern generator apparatus according to the present invention, the prescanning time required per character was found to be only 2.5 milliseconds, whereby the rate of displaying or printing the characters and symbols could be made as large as 200 characters per second.

While the invention has been described in connection with an exemplary embodiment thereof, it will be understood that many modifications will be readily apparent to those of ordinary skill in the art; and that this application is intended to cover any adaptations or variations thereof. Therefore, it is manifestly intended that this invention be only limited by the claims and the equivalents thereof.

I claim:

1. Pattern generator apparatus for producing video signals representative of predetermined characters and symbols in response to digital information applied thereto, said pattern generator apparatus comprising:

image pickup means for converting optical images formed on a target face thereof into said video signals, said image pickup means relying upon the scanning of said target face by an electron beam to convert said optical images into said video signals, said image pickup means including means for controlling the deflection and scanning of said electron beam;

a plurality of pattern carrying means having each of said characters and symbols to be displayed represented therein;

a plurality of flash tube means, each of said plurality of flash tube means being associated with one of said plurality of pattern carrying means, each of said plurality of flash tube means together with its associated one of said plurality pattern carrying means being positioned in light communication with said target face of said image pickup means whereby upon the energization of one of said flash tube means a real image of the characters and symbols present on its associated pattern carrying means will be formed on said target face;

first gating means adapted to energize a selected one of said plurality of flash tube means;

second gating means adapted to receive said video signals from said image pickup means, said gating means being connected at an output terminal thereof to output means for said pattern generator apparatus; and means responsive to said digital information to produce first and second control signals in a timed relationship, said first control signal being applied to said means for controlling the deflection and scanning of said electron beam, said first control signal being adapted to cause said electron beam to twice scan a predetermined portion of said target face of said image pickup means, said second control signal being applied as an enabling signal to said first and second gating means, said timed relationship between said first and second control signals being such that said first and second gate means are enabled at the termination of a first scan of said predetermined portion of said target face by said electron beam and at the initiation of the second scan thereof.

2. The apparatus of claim 1 wherein said predetermined portion of said target face which is twice scanned constitutes an area on said target face occupied by the real image of one of the character and symbol images formed thereon.

3. The apparatus of claim 2 wherein said means responsive to said digital information includes means operably connected to said first gating means for varying the select one of said plurality of flash tube means adapted to be energized.

4. The apparatus of claim 3 wherein said digital information comprises a plurality of parallel binary signals and said means operably connected to said first gating means for varying the select one of said plurality of flash tube means adapted to be energized is responsive to only a portion of said plurality of parallel binary signals.

5. The apparatus of claim 4 wherein the remainder of said plurality of parallel binary signals includes deflection information determinative of the location of said predetermined portion on said target face of said image pickup means.

6. The apparatus of claim 5 wherein said first control signal comprises a component indicative of said predetermined portion and a component regulating the manner in which said predetermined portion is to be scanned.

7. The apparatus of claim 6 additionally comprising digital-to-analogue converter means operably connected to said means for varying the select one of said plurality of flash tube means, said digital-to-analogue converter means adapted to receive therefrom said remainder of said plurality of parallel binary signals and in response thereto generate said component indicative of said predetermined portion.

8. The apparatus of claim 7 additionally comprising sawtooth generator means responsive to the receipt of the digital information by said pattern generator apparatus to generate said component regulating the manner in which said predetermined portion is to be scanned.

9. The apparatus according to claim 8 wherein said first gating means includes a plurality of pulse generator means, one of said plurality of pulse generator means being connected to each of said flash tube means.

10. The apparatus of claim 9 wherein each of said plurality of pulse generator means includes first and second inputs thereto, each of said plurality of pulse generator means requiring the application of input pulses to each of said inputs thereof prior to energizing the flash tube means connected thereto; means for supplying said second control signal to each of said second inputs of said plurality of pulse generator means; and means for connecting each of said first inputs of said plurality of pulse generator means to a different output of said means for varying the select one of said plurality of flash tube means.